United States Patent Office 3,557,421
Patented Jan. 26, 1971

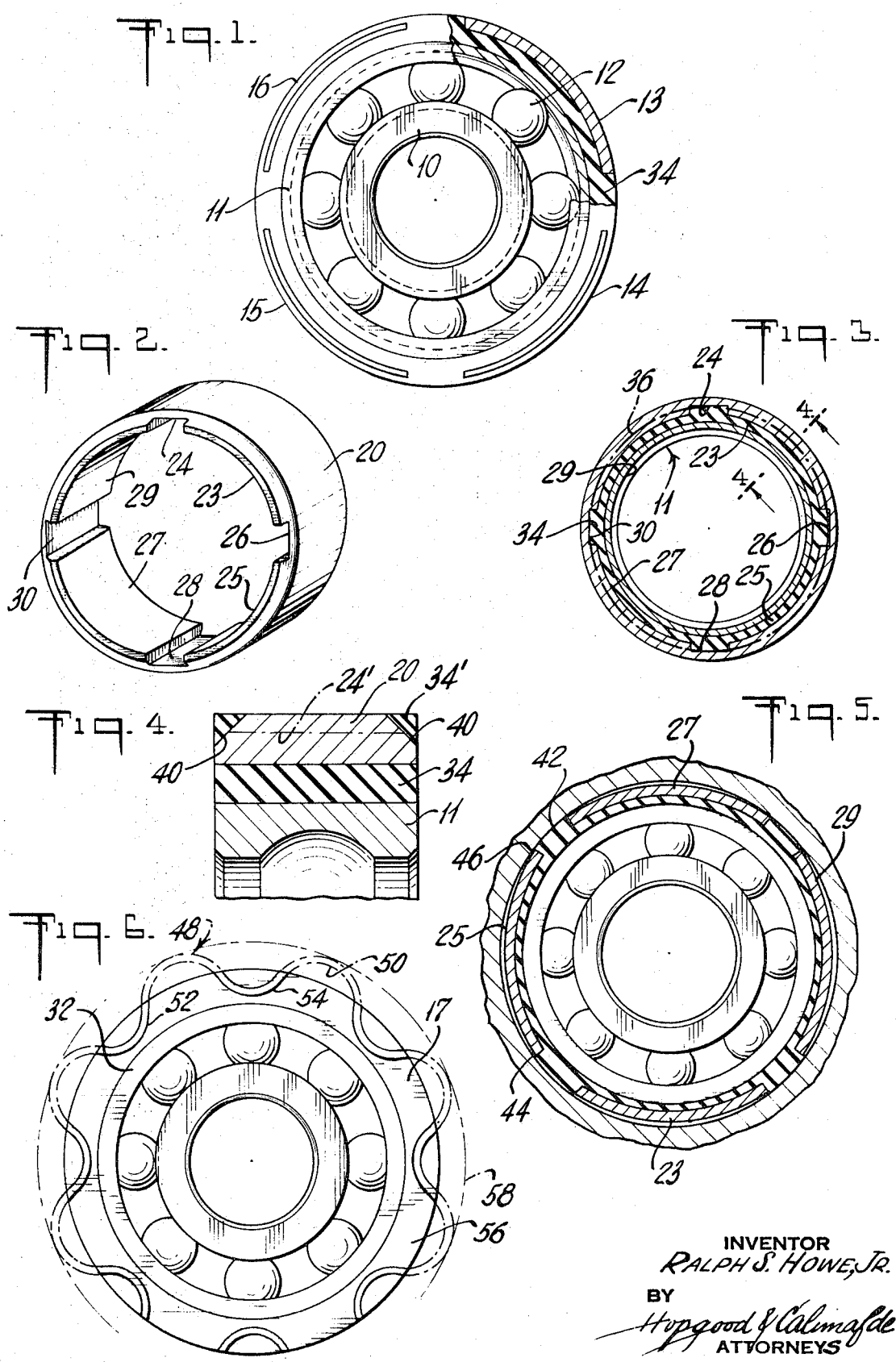

3,557,421
METHOD FOR MAKING A SELF-LOCKING RING
Ralph S. Howe, Jr., New Britain, Conn., assignor to Textron Inc., Providence, R.I., a corporation of Delaware
Filed June 20, 1968, Ser. No. 738,571
Int. Cl. B23p 11/00, 11/02
U.S. Cl. 29—148.4                                    3 Claims

ABSTRACT OF THE DISCLOSURE

A method of making a resilient self-locking structure around the periphery of a ring, such as the outer race ring of an antifriction bearing, to be mounted within a bore. Elastic material is bonded around the outer periphery of the ring, with metal feet embedded in the elastic material and having exposed outer surfaces for gripping the internal surface of the bore in which the ring is to be mounted.

The method includes the formation of a rigid clamp ring large enough for radially spaced containment of the ring to be mounted, and having a bore with a plurality of angularly distributed grooves extending axially for the length of the clamp ring, mounting the clamp ring concentrically with the ring to be mounted, and filling the space therebetween with an elastic material to bond the rings to one another. Subsequently, radially external material is removed from the composite structure to a radially inward depth necessary to produce disconnected independent rigid feet embedded in the elastic material, and having outwardly exposed clamping surfaces.

---

In my copending application entitled Self-Locking Bearing Ring, Ser. No. 681,627, filed Nov. 9, 1967 and assigned to the same assignee (Patent No. 3,503,121, with issue date of March 31, 1970), an invention is described wherein a ring such as an inner bearing ring is provided with a self-locking feature for mounting to a shaft.

I have further found that certain principles of self-locking mechanism for mounting a bearing to a shaft may advantageously be used for mounting a bearing within a bore.

Accordingly, it is an object of this invention to provide an improved method of the character indicated.

It is a further object to provide a method by which a ring can be mounted and lock itself within a bore concentrically with respect to the ring.

It is still further an object of this invention to meet the foregoing objects with a method for making a self-locking bearing ring utilizing an interference fit of resilient clamping feet to develop relatively strong resistance against planetary creep in the presence of loads, and at the same time to be effectively applicable to a relatively wide tolerance range of bore diameters.

Other objects and various further features of novelty and invention will be pointed out although others may occur to those skilled in the art from a reading of the following specification in conjunction with the accompanying drawings. In the drawings which show, for illustrative purposes only, preferred forms and methods of the invention:

FIG. 1 is a view in an end elevation of a ball bearing to which a resilient mounting structure of this invention has been applied, a portion being broken away and shown in section, at a central radial plane;

FIG. 2 is a perspective view of the ring blank utilized in the method of the invention and prior to its embodiment and treatment according to that method;

FIG. 3 is an elevation view illustrating a further step of the method used in the invention after the formation of the blank of FIG. 2;

FIG. 4 is an enlarged fragmentary sectional view taken in the plane 4—4 of FIG. 3;

FIG. 5 is a fragmentary sectional view showing radial displacements occasioned by the interference fit when the ring structure is fitted within a bore, the section being taken generally in the same plane as that of the sectioned fragment of FIG. 1; and FIG. 6 is a view similar to that of FIG. 1 but with modified metal clamping feet.

Briefly stated, the invention contemplates the fabrication of a resilient self-locking structure around the periphery of a ring to be mounted in a bore. The structure involves an annulus of elastic material bonded around the periphery of the ring and having an external diameter in slight interference with the bore diameter in which it is to be mounted. In the elastic material are embedded a plurality of rigid segments having exposed surfaces for contacting the inner surface of the bore. Hence, the interference encountered upon placement of the ring within a bore provides clamping action through like resiliently loaded, radially inwardly displaced feet.

In making the described structure, the clamping feet are first defined by a rigid ring blank having a plurality of angularly connected spaced segments forming an integral part thereof and set off by radially inwardly facing axial grooves which extend between the ends of the ring. Placed concentrically within this ring is a rigid body of peripheral extent which radially clears the bore of the first ring. Subsequently, the annular space within the rings is filled with the elastomeric material, such as rubber, neoprene or the like, and material is removed from the outer portion of the rigid ring to a radially inward depth necessary to convert the connected segments into disconnected, spaced clamping feet.

Referring to FIG. 1 of the drawings, the invention is shown in application to an antifriction bearing having the usual inner and outer race rings 10–11 with plural spaced antifriction elements, such as balls 12, riding raceways in the rings 10–11. Retainer means (not shown) may hold the balls 12 in desired spaced relation. The invention provides a self-locking or clamping structure around the external periphery of the outer bearing ring 11. It suffices in connection with FIG. 1 to state that this clamping structure involves, for the form shown, four equally angularly spaced metal clamping feet 13–14–15–16 of relatively substantial arcuate extent, concentrically positioned around the external periphery of the outer ring 11, and embedded in elastomeric material 34.

The outer bearing ring structure shown in FIG. 1 is made by initially forming a rigid cylindrical ring 20. Ring 20 has a bore characterized by a plurality of grooves 24–26–28–30. These grooves extend axially along the length of the cylinder 20 and to a radial depth less than the radial thickness of the ring 20; the groove bottoms are on a circle of diameter exceeding the bore diameter into which the completed bearing is to be installed. The ring so formed has segments 23–25–27–29 separated from one another by the grooves and connected to one another by bridges.

The outer bearing ring structure is further characterized by resilient suspension of ring 20, concentrically about and radially spaced from the outer race ring 11, as illustrated in FIG. 3. This is done by placing the rings 11–20 in a mold, in concentric relation, and by introducing elastomeric material 34 to fill all intervening spaces including the grooves 24–26–28–30. The elastomeric material is of the type which is resilient when cured and yet capable of firmly bonding the two rings together. After the bonding, the composite structure is reduced in external diameter by the removal of material in a turning or grinding operation, to a profile indicated as a dotted line at 36 having a diameter which is less than that of the groove bottoms.

The diameter at 36 is selected to be in slight interference with the bore diameter in which the composite structure is to be mounted. As can be seen from FIG. 3, the segments 23-25-27-29 are isolated from one another by the removal of the material below the groove bottom locations, thereby establishing their uniform independent resilient suspension in the elastic material surrounding the ring 11. Moreover, the concentric nature of the formation of parts, and of the turning or grinding operation, assures that the resulting clamping feet will be equal and in equally spaced relation.

For the form shown in FIG. 4, the outer edges of the faces of the ring structure are provided at 40 with annular bevels or chamfers. These chamfers extend into radial overlap with the locus 24' of groove bottoms. It will be understood that upon molding with the elastic material, and in the case of molding the parts in a right-cylindrical annular cavity, the elastic material will additionally fill the outer edges at chamfers 40, to form circumferentially continuous resilient rings as at 34', integrally united to the body 34 of material between rings 11-20.

FIG. 5 illustrates, with some exaggeration, the interference fit of the composite ring structure and bearing, when placed within a mounting bore 42. As previously indicated, bore 42 has a diameter slightly smaller than the unstressed external diameter 36 of the finished outer rings 11-20 so that upon insertion within the bore 42, the ends 44-46 of each foot (25) effectively bite into the inner surface of the bore 42 along a line extending for the length of the foot. The interference fit results in uniform radially inward resilient displacement of each of the feet 23-25-27-29. The nature of the resilient loading of each foot on the bore is to develop a strong biting action resistant to creep, stabilizing radial orientation of the bearing, and providing more stable and quiet running of mechanism carried by the bearing.

In FIG. 6, a modification is illustrated wherein the rigid ring which ultimately defines the clamping feet is itself made of undulating construction, such as corrugated steel with longitudinal flutings, where the radial undulations exceed the radial thickness of undulating material. The corrugated ring in FIG. 6 is identified at 48 and is seen to provide a plurality of angularly spaced inwardly facing grooves 50; the depth of such grooves is preferably selected to a diameter greater than the ultimate bore diameter in which the composite structure is to be mounted. The corrugated ring 48 is potted in or bonded to a body 56 of elastic material, which in turn is bonded to a bearing race ring 32 in a radially spaced, concentric manner, similar to that shown in FIG. 3. After the potting or molding (to the extend suggested at 58), the composite structure is again subjected to the turning or grinding action to remove the external materials, and sufficient material is removed (suggested by phantom outlines) to effectively isolate the remaining portions of the corrugated ring member 48. The isolated portions have a reverse curvature to that of the outer bearing ring 32, so as to form individual concave clamping feet, as at 52-54, along the external periphery of the structure. After material removal, the end points of the clamping feet 54 are flush with this external surface which has a diameter in interference with the bore diameter. Upon mounting of this structure within the bore, each of the inverted U-shaped feet 54 provides two biting line edges into the bore 42 to more positively fix and stabilize the structure within the bore.

It will be seen that I have described a basically simple and improved self-locking structure and method, particularly applicable to any ring structure to be mounted within a bore and having specific application for the case of antifriction bearings. This structure provides inherent symmetry of support and enhanced grip to the inner surface of a bore by uniformly applied resilient loading that is completely concentric. The support and grip are effective over a relatively large range of tolerances for bore diameters, and quiet running of the antifriction bearing is promoted. Moreover, the nature of the grip is such as to provide inherently less tendency to develop fretting or corrosive action between the bore and the composite structure as compared with conventional slip-fitted locking devices applied to bearings, and the continuous resilient edges or rings 34' provide seals for the clamped engagement.

I claim:

1. A method for making a self-locking ring for attachment within a mounting having a cylindrical bore of a given diameter, comprising forming a rigid ring with a bore having plural angularly spaced axially continuous grooves, thereby defining plural angularly spaced segments interconnected by bridges spanning the grooves, said ring having an outer diameter which interferes with said mounting-bore diameter, the locus of groove bottoms radially exceeding the radius of the mounting bore, selecting a second rigid body having an outer periphery to fit with radial clearance in the bore of the ring, filling the angular space between said bodies with an elastomeric material, and removing the radially outer portion of the ring to at least the radial dimension of said locus and to an extent which still interferes with the mounting bore, thereby isolating said segments from one another and defining independent resiliently mounted feet which are em-embedded within the elastic material.

2. The method as recited in claim 1 in which said ring is formed as a corrugated metal annulus wherein the grooves are defined by the inwardly facing peripheral undulations thereof.

3. The method of claim 7, wherein said second rigid body is an antifriction-bearing outer-race ring and wherein the axis of said race ring is positioned concentrically within said grooved ring during the step of filling with elastomeric material, and further wherein the material-removal step is performed concentrically with the axis of said race ring.

References Cited

UNITED STATES PATENTS 2,554,008   5/1951   Burger _____ 29—149.5

THOMAS H. EAGER, Primary Examiner

29—149.5, 450